US009547776B2

United States Patent
Tholfsen et al.

(10) Patent No.: US 9,547,776 B2
(45) Date of Patent: Jan. 17, 2017

(54) MANAGING ACCESS PERMISSIONS TO CLASS NOTEBOOKS AND THEIR SECTION GROUPS IN A NOTEBOOK APPLICATION

(71) Applicant: Microsoft Technology Licensing, LLC, Redmond, WA (US)

(72) Inventors: Michael Edward Tholfsen, Newcastle, WA (US); Ivan Hor Siu Han, Bellevue, WA (US); Jonathan Thomas Grudin, Issaquah, WA (US); Thomas Wionzek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 14/633,951

(22) Filed: Feb. 27, 2015

(65) Prior Publication Data

US 2016/0162702 A1 Jun. 9, 2016

Related U.S. Application Data

(60) Provisional application No. 62/089,059, filed on Dec. 8, 2014.

(51) Int. Cl.
*G06F 21/00* (2013.01)
*G06F 21/62* (2013.01)
*G09B 5/02* (2006.01)

(52) U.S. Cl.
CPC ....... *G06F 21/6245* (2013.01); *G06F 21/6218* (2013.01); *G09B 5/02* (2013.01);
(Continued)

(58) Field of Classification Search
CPC .................................................. G06F 21/6245
(Continued)

(56) References Cited

U.S. PATENT DOCUMENTS 6,733,295 B2  5/2004  Stuppy et al.
7,444,390 B2 * 10/2008  Tadayon ........... G06F 17/30067
                                                          707/999.002
(Continued)

FOREIGN PATENT DOCUMENTS

WO  2013049907 A1  4/2013

OTHER PUBLICATIONS

Rachel, "Add a Co-Teacher to Your Group (Teacher)", Published on: Jun. 9, 2013, Available at: https://support.edmodo.com/entries/21860210-Add-a-Co-Teacher-to-Your-Group-Teacher-#teacher.
(Continued)

*Primary Examiner* — Longbit Chai
(74) *Attorney, Agent, or Firm* — Monica Adjemian; Tom Wong; Micky Minhas

(57) ABSTRACT

A method of adding a co-teacher to an original teacher's class notebook can include, in response to receiving a request, at a client device, to add a co-teacher to a class notebook managed by a classroom notebook application, assigning the co-teacher full read/write permissions to the teacher's class notebook including any section groups having connected role inheritances. The co-teacher is also assigned full read/write permissions to the student-specific section groups and the collaboration space section group, which are all in the class notebook and which have broken permission inheritance. To protect the teacher's personal folder, which is a parent folder to the teacher's class notebook, the classroom notebook application removes the co-teacher's permissions to the teacher's personal folder.

20 Claims, 6 Drawing Sheets

(52) U.S. Cl.
CPC ............ *G06F 2221/2141* (2013.01); *G06F 2221/2145* (2013.01)

(58) Field of Classification Search
USPC .......................................................... 726/4
See application file for complete search history.

(56) References Cited

U.S. PATENT DOCUMENTS

| | | | |
|---|---|---|---|
| 7,734,694 | B2 | 6/2010 | Cannata et al. |
| 7,885,913 | B2 | 2/2011 | Weber et al. |
| 2011/0145733 | A1 | 6/2011 | Neitz et al. |
| 2013/0014023 | A1 | 1/2013 | Lee et al. |
| 2013/0109002 | A1 | 5/2013 | Howard et al. |
| 2014/0006914 | A1 | 1/2014 | Visconsi et al. |
| 2014/0087351 | A1 | 3/2014 | Huppenthal |
| 2014/0210734 | A1 | 7/2014 | Windbrake et al. |
| 2014/0272910 | A1 | 9/2014 | Del Ninno et al. |
| 2015/0067879 | A1* | 3/2015 | Appalabattula ........ G06Q 50/01 726/26 |

OTHER PUBLICATIONS

"Co-teaching—Amplify Education Inc", Retrieved on: Dec. 1, 2014, Available at: https://systemsupport.amplify.com/0_Using_Your_Tablet/User_Guide/1_Class_tools_and_notebooks/4_Co-teaching.

Cauley, Patrick, "Edmodo Version 3.1", Published on: Jun. 18, 2013, Available at: http://www.csub.edu/~tfernandez_ulloa/Edmodo%20User%20guide.pdf.

"FAQ—Diigo Help", Published on: Oct. 21, 2009, Available at: http://help.diigo.com/teacher-account/faq.

"Getting Started—Diigo Help", Published on: Oct. 22, 2009, Available at: http://help.diigo.com/teacher-account/getting-started.

Sam, "SMART amp™—collaborative learning software", Published on: Jun. 26, 2014, Available at: http://downloads01.smarttech.com/media/sitecore/en/support/product/amp/guides/guidesmartampv20nov14.pdf.

Misspink, "Teaching with Evernote—an Explanation", Published on: Jan. 28, 2014, Available at: http://becspink.com/2014/01/28/teaching-with-evernote-an-explanation/.

"International Search Report and Written Opinion Issued in PCT Application No. PCT/US2015/064160", Mailed Date: Feb. 23, 2016, 11 Pages.

Webster, Darrell, "OneNote Class Notebook Creator—Adding More Teachers", Retrieved at <<http://webster.tech/2014/11/onenote-class-notebook-creator-adding-teachers/>>, Nov. 1, 2014, pp. 1-8.

Webster, Darrell, "OneNote Class Notebook Creator—Adding More Teachers", Retrieved at <<https://www.youtube.com/watch?feature=player_embedded&v=zk6B1xHXzHY>>, Oct. 31, 2014, pp. 1-1.

"Manage Permissions for a Web Application in SharePoint 2013", Retrieved at <<https://technet.microsoft.com/en-us/library/ff607719.aspx>>, Dec. 18, 2013, pp. 1-2.

Leland, et al., "Collaborative Document Production Using Quilt", In Proceedings of the ACM Conference on Computer-Supported Cooperative Work, Sep. 26, 1988, pp. 206-215.

* cited by examiner

MANAGING ACCESS PERMISSIONS TO CLASS NOTEBOOKS AND THEIR SECTION GROUPS IN A NOTEBOOK APPLICATION

CROSS REFERENCE TO RELATED APPLICATION

This application claims the benefit of U.S. Provisional Application Ser. No. 62/089,059, filed Dec. 8, 2014.

BACKGROUND

A notebook application refers to an application that allows users to save and curate content, often collected from online resources through "clippers" or typed, "inked" (using a stylus), or pasted into a notebook directly by the user. In addition to providing tools for inputting and organizing the collected content, some notebook applications include sharing and collaboration features. Notebook applications may be stand-alone applications or web-based. Examples of notebook applications include Microsoft OneNote®, Evernote®, and Google® Notebook (now discontinued).

The sharing and collaboration features of certain notebook applications, such as Microsoft OneNote®, and SMART Notebook® can be useful in educational environments, providing a platform for interactive learning as well as distance learning. Access to a particular lesson plan or notebook may vary depending on the particular notebook application and platform.

BRIEF SUMMARY

A classroom notebook application is described that enables different users having different access rights to operate not only within a single notebook, but also with different levels of access for section groups within that notebook.

Through the systems and techniques described herein, the classroom notebook application facilitates adding a co-teacher to a class notebook that includes section groups including student-specific section groups for each of the students, a collaboration space, and a content library. The teacher has read/write access for the entire class notebook, including the student-specific section groups, the collaboration space, and the content library. Instead of using separate notebooks, the students have read access to the content library, read/write access to the collaboration space, and read/write access to their specific section group of the teacher's class notebook. To enable a single notebook to be shared where different section groups have different desired access rights, the student-specific section groups and the collaboration space have broken permission inheritance so that the particular desired permissions may be achieved.

A method of adding a co-teacher to an original teacher's class notebook can include, in response to receiving a request to add a co-teacher to a class notebook, assigning the co-teacher full read/write permissions to the teacher's class notebook including any section groups having connected role inheritances; assigning the co-teacher full read/write permissions to the student-specific section groups and the collaboration space which have the broken permission inheritance; and removing the co-teacher's permissions to the teacher's personal documents folder, which is a parent folder of the teacher's class notebook.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A classroom notebook application is described that enables different users having different access rights to operate not only within a single notebook, but also with different levels of access for section groups within that notebook. Through the systems and techniques described herein, the classroom notebook application facilitates adding a co-teacher to a class notebook.

A notebook application like Microsoft OneNote® utilizes a structure in which a notebook includes pages of content organized into sections, which are further organized into groups (referred to as "section groups") within the notebook. The described classroom notebook application takes advantage of this type of structure to improve collaboration and work efficiency for educational scenarios. In particular, a teacher can have a class notebook. Then, instead of using separate notebooks for each student, the students can be assigned a section group of the teacher's class notebook. Advantageously, this may reduce synchronization issues with managing multiple notebooks and can positively affect how the content is stored and managed.

However, because a class notebook of the classroom notebook application is "owned" by the primary user (the teacher), sharing section groups of the notebook with different access permissions as well as specifying access for other people to the class notebook as a whole is challenging. For example, conceptually for a classroom notebook application, it is desirable to provide the teacher access to each student's notebook while providing the students access to only their notebook (and not another student's notebook). Thus, where student notebooks are actually section groups of a teacher's class notebook, it is desirable to provide the teacher access to each student's section group and to provide the students access to only their section group. In addition, the teacher and all of the students should have read/write access to a collaboration space.

Figure 1:
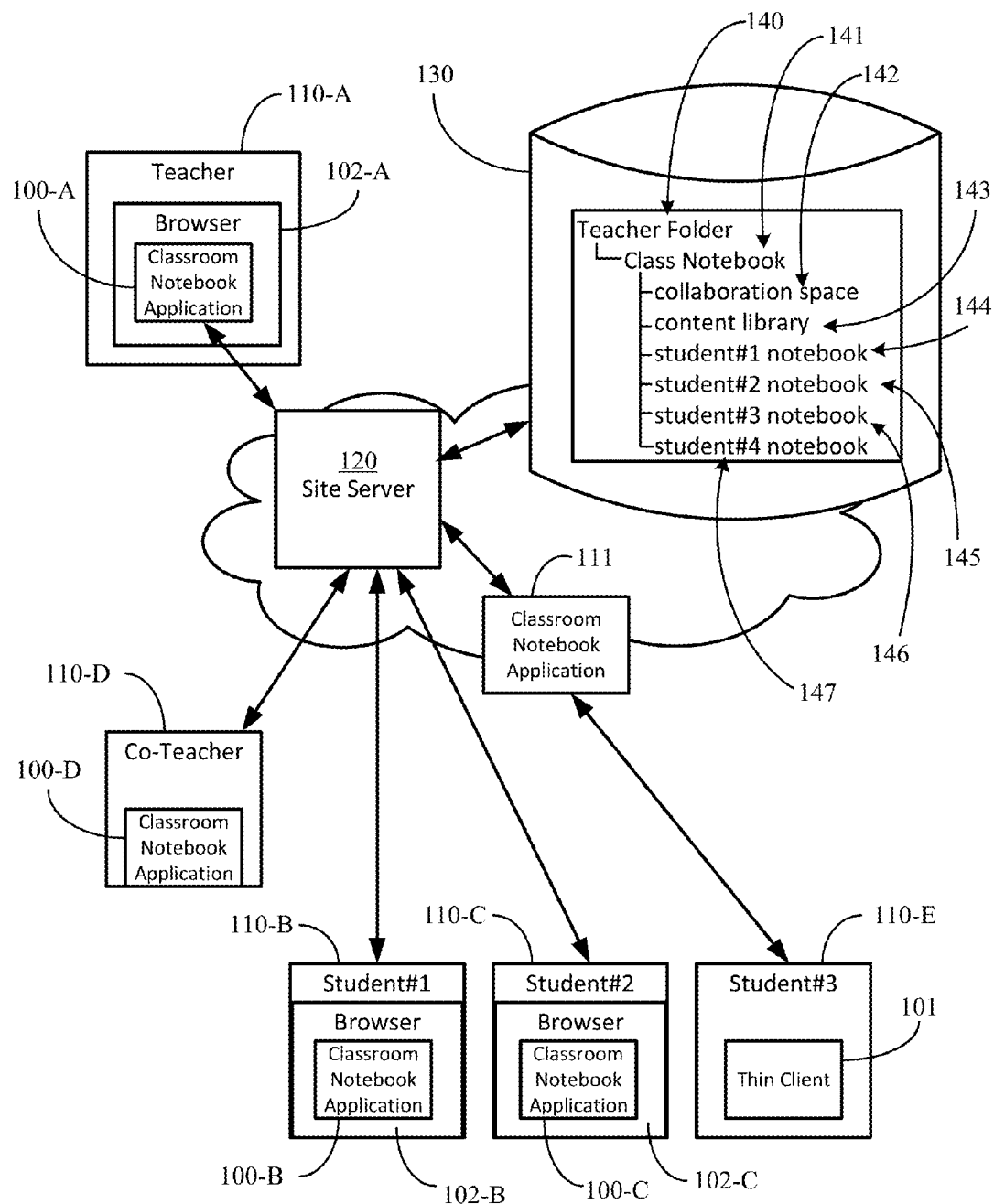
FIG. 1 illustrates an example operating environment.
Figure 2:
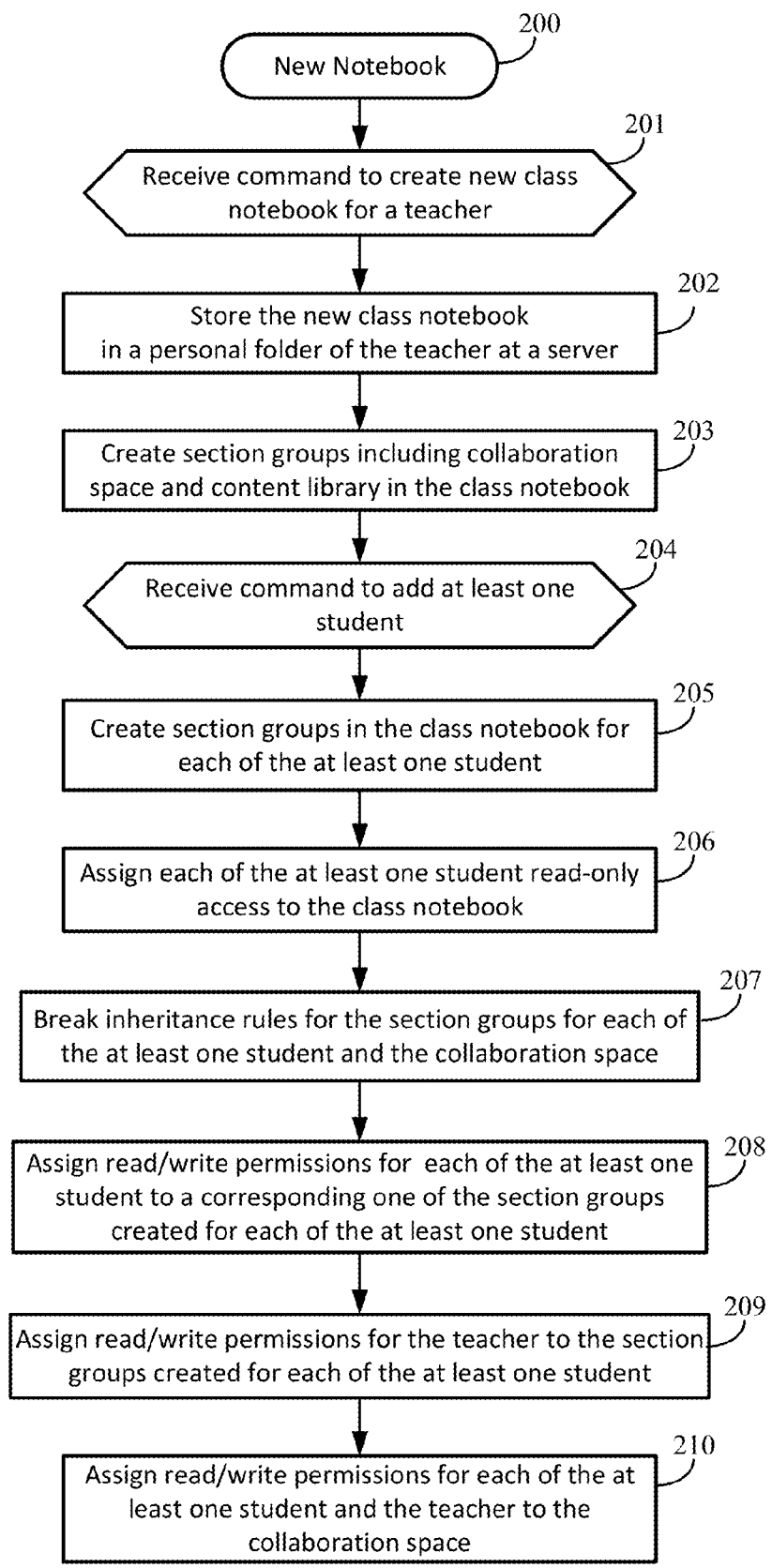
FIG. 2 illustrates a process flow through which a classroom notebook application creates and manages a class notebook.

FIG. 1 illustrates an example operating environment; and FIG. 2 illustrates a process flow through which a classroom notebook application creates and manages a class notebook.

Figure 5:
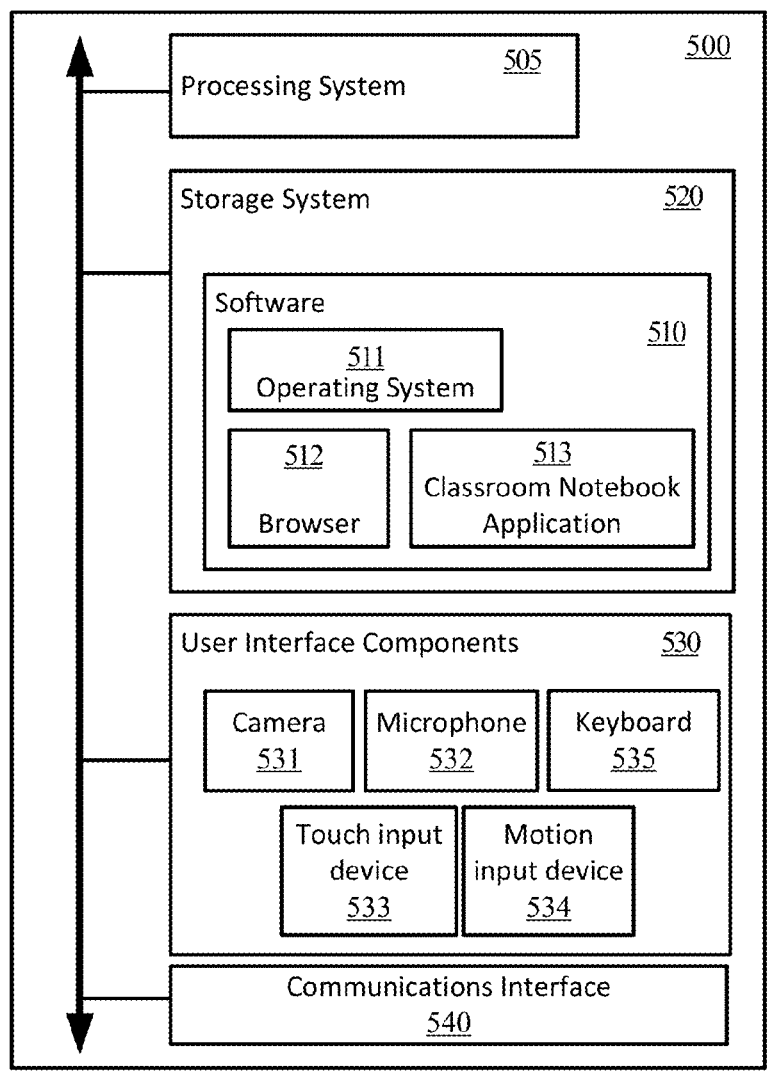
FIG. 5 is a block diagram illustrating components of a computing device or system that may be used to carry out some of the processes described herein.

Referring to FIG. 1, in certain implementations, a classroom notebook application 100-A, 100-B, 100-C is executed on a client browser 102-A, 102-B, 102C at a client device (e.g., teacher client device 110-A and student client devices 110-B and 110-C of which computing device 500 described with respect to FIG. 5 is representative). In some other implementations, the classroom notebook application 100-D is a standalone application at a client device, such as shown for co-teacher device 110-D (of which computing device 500 described with respect to FIG. 5 is representative). In yet some other implementations, the classroom notebook application includes a thin client 101 at a client device, such as for student client device 110-E (of which computing device 500 described with respect to FIG. 5 is representative), and server-side executable modules 111. The classroom notebook application enables a user of the client device to view and edit content stored at a server, such as site server 120 and storage server 130. The classroom notebook application retrieves content from the server(s) 120, 130 and makes calls to the server 120 (through application programming interfaces).

The classroom notebook application (in any suitable form) can communicate with site server 120, for example a cloud service or designated server, to retrieve and update content stored at a storage server (or servers) 130. The site server 120 and the storage server 130 may be a same computing system, a distributed computing system, and/or separate systems that communicate with each other. The site server 120 can manage the content at the storage server 130 and can, in some cases, enable collaboration with respect to the content. For example, the site server 120 can be a Microsoft SharePoint® server that serves an organization to which a teacher, students, and co-teacher(s) belong. That is, class notebooks can be stored associated with a teacher's personal folder in a cloud storage service, collaboration and management platform (such as Microsoft SharePoint®) or an enterprise system. The teacher can then access the class notebook and interact with it according to any of the features of the classroom notebook application.

In addition to interacting with (e.g., reading, modifying, etc.) existing class notebooks, at a teacher client device 110-A, a teacher can use the classroom notebook application 100-A to create a new class notebook (200), as illustrated in FIG. 2. When the classroom notebook application receives a command to create a new class notebook for a teacher (201), the classroom notebook application 100-A communicates with server 120 to store the new class notebook 141 in a personal folder of the teacher 140 (202).

Section groups (e.g., sub-folders) can then be created under the class notebook 141. For example, the class notebook 141 can have one section group identified as a collaboration space 142 and another section group identified as a content library 143 (203). In addition, either at the time of new class notebook creation or in response to a specific request to add a student (204), section groups can be created for each student (205). For example, a first student section group 144, a second student section group 145, a third student section group 146, and a fourth student section group 147 may be created.

Accordingly, the new class notebook can be considered a new folder in the personal folder of the teacher and the various section groups that are created can be considered sub-folders in the new folder of the new class notebook. However, for the class notebook to function appropriately, the goal is for the teacher to have read/write access to all section groups (e.g., all "section group" sub-folders under the folder for the class notebook) and for each student to have read-only access to the content library 143, read/write access to the collaboration space 142, and read/write access to their own notebook section group (with no access or permissions to the other students' section groups).

When a new class notebook is created in the personal folder of the teacher 140 the access rights to the class notebook 141 are established, giving a teacher full read/write access. Then, either at the time of new class notebook creation or in response to a specific request to add a student (204), individuals identified to the classroom notebook application as being students are given read-only permissions to the class notebook (206). As a section group (e.g., 142-147) is generated for the class notebook 141, it inherits the access settings of the parent (i.e., the class notebook). The default settings for the teacher are read/write enable for the class notebook 141 and, thus, the section groups. Similarly, when a student is added to access the class notebook with read-only capabilities and a student notebook section is added to the class notebook for that student, the default access rights for that student is read-only for all of the section groups of the class notebook, including their own notebook section group.

That is, the notebook and its section groups can have associated access control lists (ACL). Sub-folders automatically inherit the ACL of their parent folder. Because students are given read-only access to the parent "notebook" folder, students automatically have read-only access to every other sub-folder, including other students' section groups.

As mentioned above, since the ultimate goal is for the teacher to have read/write access to all section groups and for each student to have read-only access to the content library 143, read/write access to the collaboration space 142, and read/write access to their own notebook section group (with no access to the other students' section groups), the classroom notebook application breaks the role inheritance of the collaboration space section group and the student notebook section groups (207). The breaking of the role, or permission, inheritance can be accomplished by assigning a new ACL to the section group. Then, both the teacher and the student are granted read/write access through the new ACL.

For a student notebook section group, as it is created, its role inheritance can be broken. Then, only the particular student and the teacher are added with read/write capabilities (208, 209). For the collaboration space section group 142, after breaking the role inheritance, the teacher and each student is added back to the collaboration space section group 142 with read/write access (210). Although shown in descending order, operations 208, 209, and 210 may be performed in any order. Once student permissions are properly established, students may be notified. For example, student personal folders may be populated with links to the class notebook and even direct links to their own section group of the class notebook. In some cases, the teacher may email or otherwise communicate the links to the students.

When a new student is added to an existing class notebook, the classroom notebook application creates a new section group for the new student in the class notebook, breaks the role inheritance, and associates the correct permissions by adding the teacher and the student back in with read/write capabilities. Advantageously, since the other student notebooks have already had their inheritance broken, adding a new student to the class notebook does not automatically grant that student read-only rights to the other students' notebooks. However, since the collaboration space is also broken from the inheritance rules, the new student has to be added to the collaboration space section group for read/write access.

Because the class notebook is "owned" by the teacher and stored associated with the teacher's personal folder, the challenge arises with how to enable more than one teacher to have permissions to use and interact with the class notebook, the collaboration space, the content library, and the student-specific section groups. This scenario may occur when there is a need to add a co-teacher, a student teacher, or a substitute teacher to the class notebook so that the co-teacher, student teacher, or substitute teacher have read/write capabilities for the collaboration space and the student-specific section groups to more effectively facilitate the teaching and learning experience in a 1:1 computing environment.

Figure 3A:
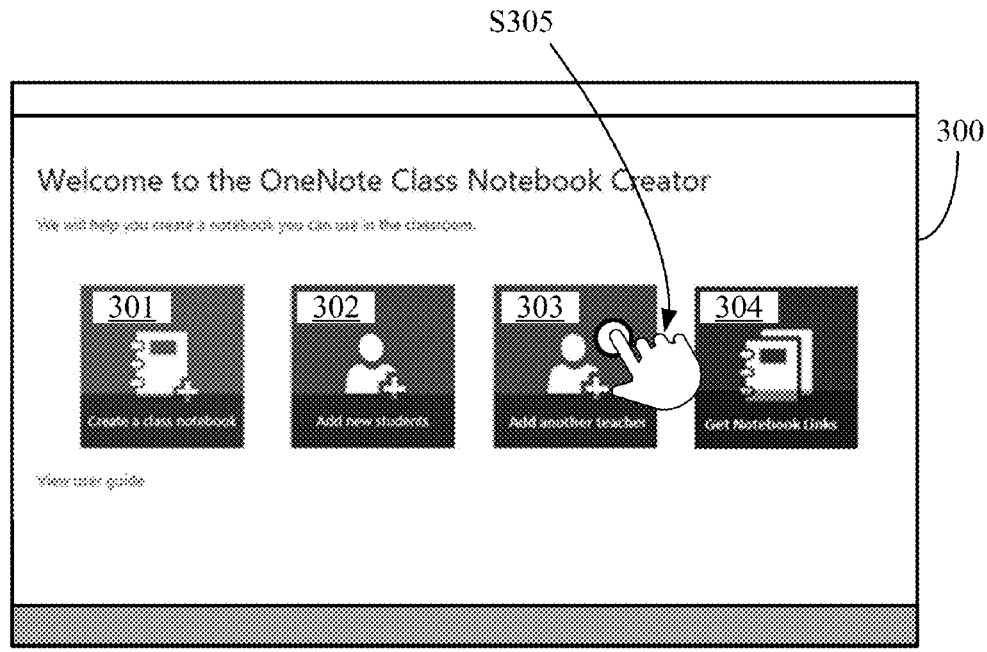
FIGS. 3A-3D illustrate a graphical user interface of the classroom notebook application for a teacher to indicate a desire to add a particular co-teacher.

To enable the addition of co-teachers to a class notebook, the classroom notebook application includes a mechanism to assign the appropriate permissions to the class notebook and its section groups. FIGS. 3A-3D illustrate a graphical user interface of the classroom notebook application for a teacher to indicate a desire to add a particular co-teacher. The graphical user interface is displayed on a teacher's client device running the classroom notebook application (e.g., device 110-A with application 100-A of FIG. 1). Referring to FIG. 3A, the classroom notebook application can have a graphical user interface 300 providing icons representing tools such as "create a class notebook" 301, "add new students" 302, "add another teacher" 303, and "get notebook links" 304. When a user selects (S305) the "add another teacher icon" 303, the graphical user interface responds with a workflow to obtain the information that the classroom notebook application needs to add a co-teacher to a particular class notebook.

Figure 3B:
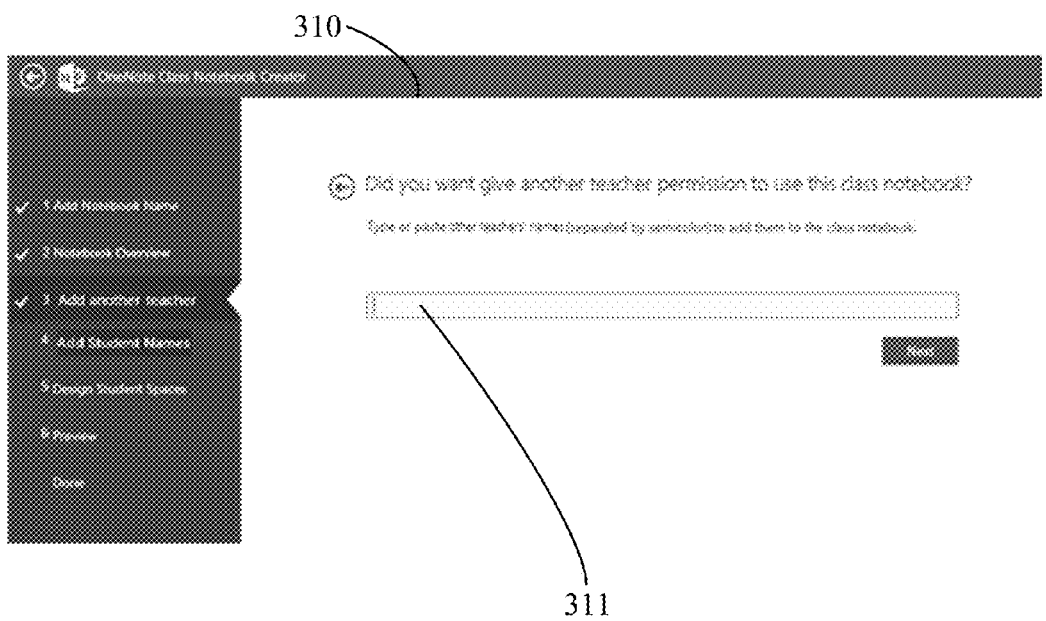
Figure 3C:
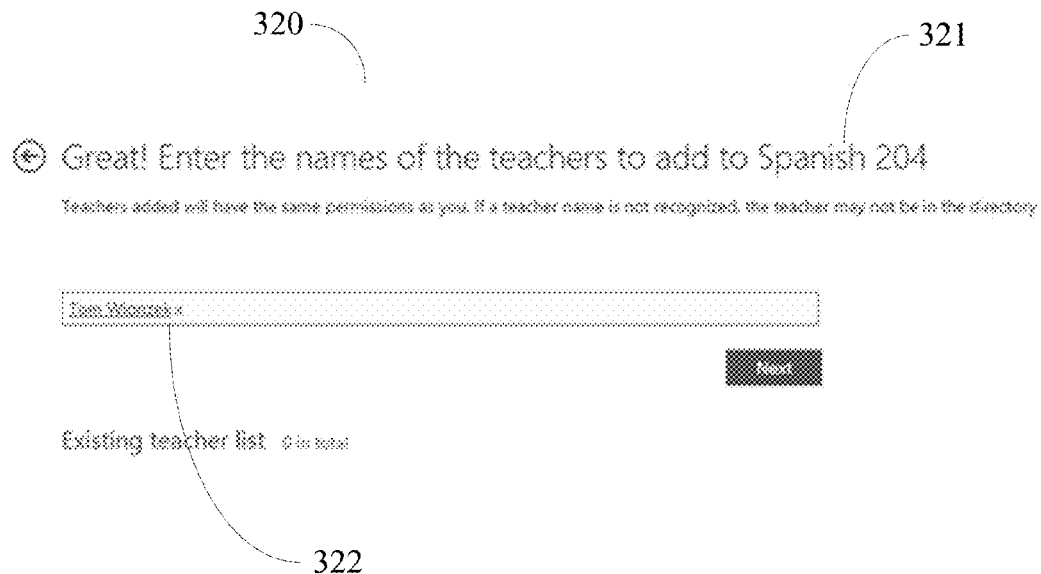
Figure 3D:
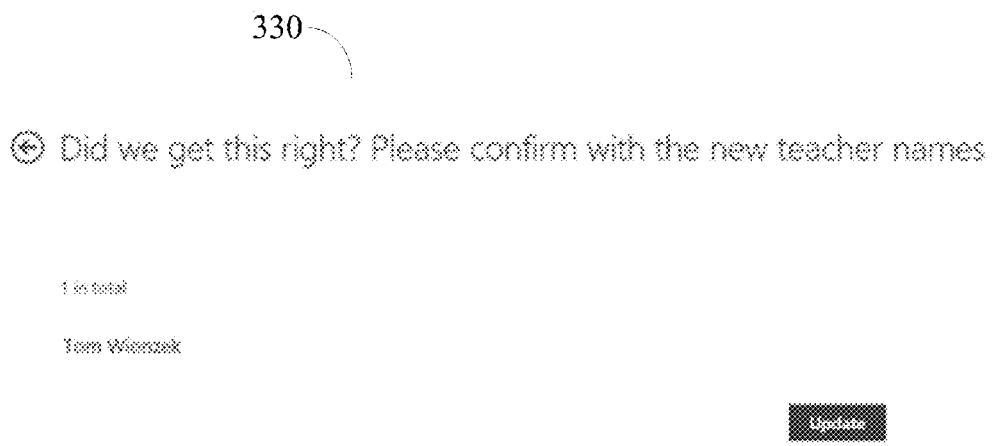

As part of the workflow, the classroom notebook application presents an add teacher view 310 with an input field 311 through which a user can input the name of at least one person to add as a co-teacher, as illustrated in FIG. 3B. FIG. 3C illustrates another implementation of an add teacher view 320 in which the particular class notebook 321 is identified (e.g., "Spanish 204") and an input field 322 is provided through which a user can input the name of at least one co-teacher. Since the teachers, students, and co-teachers are part of a same organization, the classroom notebook application can resolve a co-teacher's name to a member list of the organization. The user may also be prompted to confirm that the appropriate co-teacher is being input, as shown in the interface view 330 of FIG. 3D before the information about the co-teacher to be added is used by the classroom notebook application to add that co-teacher to the identified class notebook 321.

It should be understood that other interfaces, including audio interfaces, may be used to input the co-teacher information. Once the information is received by the classroom notebook application via the graphical user interface (or any other suitable user interface), the classroom notebook application performs a process to appropriately assign permissions, for the co-teacher, to the class notebook and the section groups.

Figure 4A:
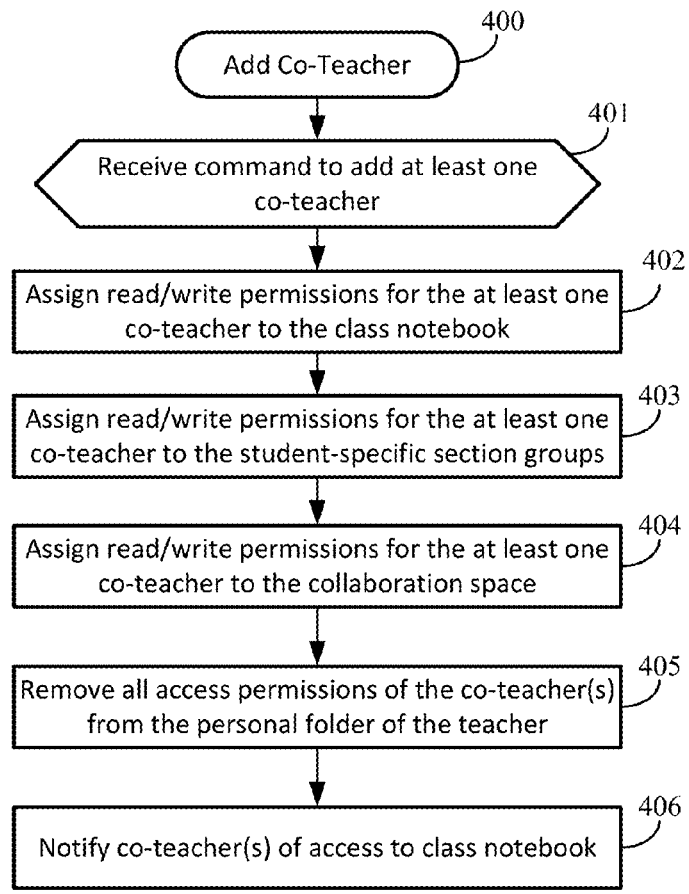
FIG. 4A illustrates a process flow through which a classroom notebook application adds a co-teacher to a class notebook.

This method is illustrated in FIG. 4A. Referring to the process to add a co-teacher (400) of FIG. 4A, for each co-teacher information received by the classroom notebook application (401), the classroom notebook application adds co-teacher(s) with read/write permissions to the parent level of the class notebook (402). Because the student section groups have broken role inheritance, the classroom notebook application adds the co-teacher to each of the student section groups to give the co-teacher read/write permissions (403). In addition, since the collaboration space section group has a broken role inheritance, the classroom notebook application adds the co-teacher to the collaboration space section group with read/write permissions (404).

Advantageously, instead of making copies of the notebook, co-authoring capabilities are leveraged. Therefore, if a co-teacher is removed at some point, there is no extra copy of content left with the co-teacher that has to be removed in some manner. This is helpful for both security and data storage issues.

Through this process, co-teachers are given the same permissions as the owning teacher. Co-teachers have full write permissions to the notebook. By virtue of this, co-teachers will have full write permission to all section groups, sections, and pages within the notebook including the collaboration space, the content library, and every student section. This also implies that co-teachers can add new section groups, sections, and pages and that every other co-teacher will have write access to these new section groups, sections, and pages. Because adding a co-teacher treats the co-teacher as a co-author of the class notebook, co-teachers are given, as a default, manage permissions to the site, which includes the teacher's personal folder.

A teacher may not want to enable the co-teacher to access their personal folder. To avoid this undesirable access, the classroom notebook application fixes permissions at the site-level, protecting the teacher's personal folder from the co-teachers by hiding the folder entirely (giving co-teachers no permissions to the teacher's personal folder). That is, access permissions of the co-teacher that arose from originally assigning read/write permissions for the co-teacher to the class notebook in general (e.g., operation 402) are removed at the site level so the co-teacher does not have access to the personal folder of the teacher (405).

The classroom notebook application can communicate with any server storing the content associated with a teacher's class notebook (and/or site on which the application may be run) to add a co-teacher. Advantageously, regardless of which site the classroom notebook application is run from, the classroom notebook application guarantees that only the original teacher has access to his or her personal notebooks folder. Co-teachers are given write access to the notebook, but not the folder containing said notebooks thereby providing a level of isolation and security.

Once a co-teacher has been added to a class notebook, the classroom notebook application can notify the co-teacher that they have access to the class notebook (406). The notification can be automatic. For example, the co-teacher's personal folder (e.g., a "shared with me" folder) can be automatically populated with a link to the class notebook once the co-teacher has been added to the class notebook with the appropriate access rights. In other cases, the notification can be carried out in response to a specific command of the teacher. For example, in response to receiving a share command, the classroom notebook application can generate a link to the class notebook and provide the link for display or to an email application so that the teacher can send an email with the link.

Figure 4B:
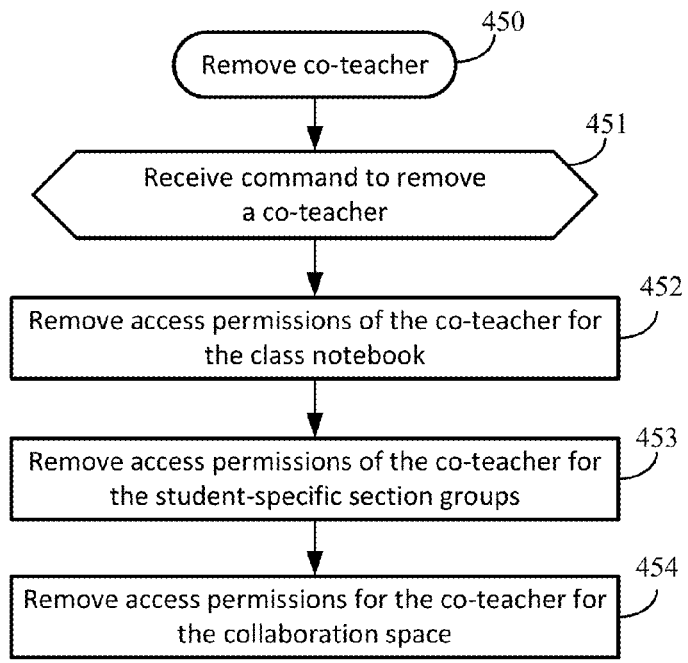
FIG. 4B illustrates a process flow for removing a co-teacher from a class notebook.

FIG. 4B illustrates a process flow for removing a co-teacher from a class notebook. The process to remove a co-teacher (450) can begin upon receipt of a command to remove a co-teacher (451). The classroom notebook application removes access permissions of the co-teacher for the class notebook (452), removes access permissions of the co-teacher for the student-specific section groups, and removes access permissions for the co-teacher for the collaboration space (454). Advantageously, since copies of the notebook(s) are not associated with the co-teacher, once the access permissions are adjusted in the teacher's class notebook, there is no extra copy of content left with the co-teacher that has to be removed in some manner.

FIG. 5 is a block diagram illustrating components of a computing device or system that may be used to carry out some of the processes described herein. Referring to FIG. 5, device 500 may represent a computing device such as, but not limited to, a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to device 500 may be incorporated to implement a particular computing device.

Device 500, for example, includes a processing system 505 of one or more processors to transform or manipulate data according to the instructions of software 510 stored on a storage system 520. Examples of processors of the processing system 505 include general purpose central processing units, application specific processors, and logic devices, as well as any other type of processing device, combinations, or variations thereof.

The software 510 can include an operating system 511 and application programs or components such as a web browser 512 and a classroom notebook application 513. Device operating systems 511 generally control and coordinate the functions of the various components in the computing device 500, providing an easier way for applications to connect with lower level interfaces like a communications/networking interface (540). Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system 511 may be implemented both natively on the computing device and on software virtualization layers running atop the native device operating system (OS). Virtualized OS layers, while not depicted in FIG. 5, can be thought of as additional, nested groupings within the operating system space, each containing an OS, application programs, and APIs.

Storage system 520 includes any computer readable storage media readable by the processing system 505 and capable of storing software 510. Storage system 520 may include volatile and nonvolatile, removable and non-removable media implemented in any method or technology for storage of information, such as computer readable instructions, data structures, program modules, or other data. Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal or carrier wave. In addition to storage media, in some implementations, storage system 520 may also include communication media over which software may be communicated internally or externally.

Storage system 520 may be implemented as a single storage device but may also be implemented across multiple storage devices or sub-systems co-located or distributed relative to each other. Storage system 520 may include additional elements, such as a controller, capable of communicating with processing system 505.

Software 510 may be implemented in program instructions and among other functions may, when executed by device 500 in general or processing system 505 in particular, direct device 500 or the one or more processors of processing system 505 to operate as described herein for managing access permissions to class notebooks and their section groups in a notebook application (see e.g., process flows of FIGS. 1 and 4).

In general, software may, when loaded into processing system 505 and executed, transform computing device 500 overall from a general-purpose computing system into a special-purpose computing system customized manage access permissions to a class notebook and add a co-teacher with the appropriate permissions to the class notebook and its section groups as described herein. Through such steps a single notebook stored at a server may be used in a collaborative manner, while maintaining appropriate access and privacy settings for each of the users.

The system can further include user interface components 530. User interface components 530 can include input devices such as a camera for detecting visual input 531, a microphone for detecting speech or sounds 532, a touch device 533 for receiving a touch gesture from a user, a motion input device 534 for detecting non-touch gestures and other motions by a user, and other user interface components including input devices such as a keyboard 535 or mouse (note shown). User interface components 530 can also include output devices (not shown) such as display screens, speakers, or haptic devices for tactile feedback. In certain cases, the input and output devices may be combined in a single device, such as a touchscreen display which both depicts images and receives touch gesture input from the user. Visual output may be depicted on the display in myriad ways, presenting graphical user interface elements, text, images, video, notifications, virtual buttons, virtual keyboards, or any other type of information capable of being depicted in visual form.

A natural user interface (NUI) may be included. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

User interface components 530 may also include user interface software and associated software (e.g., for graphics chips and input devices) executed by the OS in support of the various user input and output devices. The associated software assists the OS in communicating user interface hardware events to application programs using defined mechanisms. The user interface components 530 including user interface software may support a graphical user interface, a natural user interface, or any other type of user interface.

A communication interface 540 is included, providing communication connections and devices that allow for communication between device 500 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here. Transmissions to and from the communications interface are controlled by the OS 511, which informs applications and APIs of communications events when necessary.

It should be noted that many elements of device 500 may be included in a system-on-a-chip (SoC) device. These elements may include, but are not limited to, the processing system 505, elements of the storage system 520, and even elements of the communications interface 540.

Computing device 500 is generally intended to represent a computing system with which software is deployed and executed in order to implement a classroom notebook application as described herein.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Figure 6:
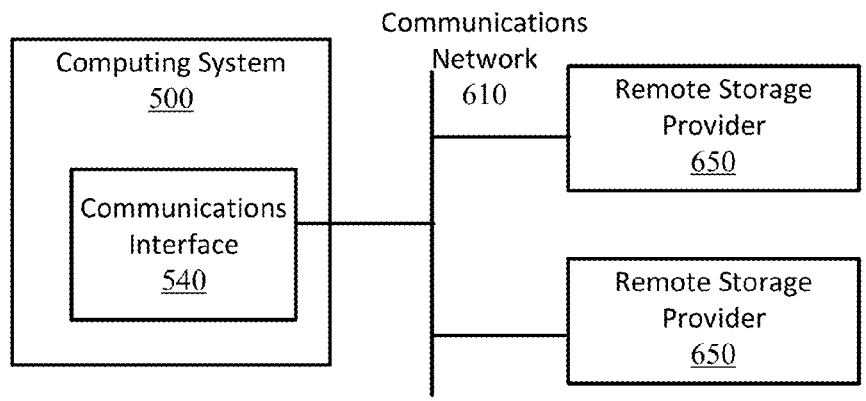
FIG. 6 depicts an architecture in which several computing devices are networked.

Content accessed by the classroom notebook application 513 may be stored on any number of remote storage platforms 650 that may be accessed by the device 500 over communication networks 610 via the communications interface 540, as illustrated in FIG. 6. Such remote storage providers might include, for example, a server computer in a distributed computing network or an enterprise network. They may also include "cloud storage providers" whose data and functionality are accessible to applications through OS functions or APIs. In a specific implementation, the classroom notebook application 513 communicates with a Microsoft SharePoint® server (associated with a remote storage provider) through APIs.

Certain aspects of the invention provide the following non-limiting embodiments:

EXAMPLE 1

A method of managing access permissions to class notebooks, comprising: receiving a request, at a client device, to add a co-teacher to a class notebook associated with a personal folder of a teacher that is stored at a server, wherein the class notebook comprises a collaboration section group, a content library section group, and a plurality of student-specific section groups, wherein the collaboration section group and each of the plurality of student-specific section groups have broken role inheritances from the class notebook; assigning the co-teacher to the class notebook, including any section groups of the class notebook having connected role inheritances, with read/write permissions; assigning the co-teacher to the collaboration section group and each of the plurality of student-specific section groups, which have the broken role inheritances, with read/write permissions; and removing read/write permissions of the co-teacher from the personal folder of the teacher.

EXAMPLE 2

The method of example 1, wherein assigning the co-teacher to the class notebook comprises requesting the server to store the read/write permissions for the co-teacher associated with the class notebook.

EXAMPLE 3

The method of example 1 or 2, wherein assigning the co-teacher to the collaboration section group and each of the plurality of student-specific section groups comprises requesting the server to store the read/write permissions for the co-teacher associated with the collaboration section group and each of the plurality of student-specific section groups.

EXAMPLE 4

The method of any of examples 1-3, wherein removing the read/write permissions of the co-teacher from the personal folder of the teacher comprises requesting the server to remove the co-teacher from access to the personal folder of the teacher.

EXAMPLE 5

The method of any of examples 1-4, further comprising: notifying the co-teacher that they have access to the class notebook by automatically populating the co-teacher's personal folder with a link to the class notebook.

EXAMPLE 6

The method of any of examples 1-5, further comprising adding a new student to the class notebook by: assigning the new student a read-only role to the class notebook; creating a new section group in the class notebook; breaking a role inheritance setting of the new section group; assigning the new student with read/write permissions to the new section group; assigning the teacher and any co-teachers with read/write permissions to the new section group; and assigning the new student with read/write permissions to the collaboration space.

EXAMPLE 7

The method of any of examples 1-6, further comprising removing the co-teacher from the class notebook by: removing access of the co-teacher to the class notebook; removing access of the co-teacher to the collaboration space; and removing access of the co-teacher to the plurality of student-specific section groups.

EXAMPLE 8

One or more computer readable storage media having instructions stored thereon that, when executed by a processing system, direct the processing system to: assign a co-teacher with read/write permissions to a class notebook associated with a personal folder of a teacher that is stored at a server, including any section groups of the class notebook having connected role inheritances, wherein the class notebook comprises a collaboration section group, a content library section group, and a plurality of student-specific section groups, wherein the collaboration section group and each of the plurality of student-specific section groups have broken role inheritances from the class notebook; assign the co-teacher to the collaboration section group and each of the plurality of student-specific section groups, which have the broken role inheritances, with read/write permissions; and remove read/write permissions of the co-teacher from the personal folder of the teacher.

EXAMPLE 9

The media of example 8, wherein the instructions to assign the co-teacher to the class notebook direct the processing system to request the server to store the read/write permissions for the co-teacher associated with the class notebook.

EXAMPLE 10

The media of example 8 or 9, wherein the instructions to assign the co-teacher to the collaboration section group and each of the plurality of student-specific section groups direct the processing system to request the server to store the read/write permissions for the co-teacher associated with the collaboration section group and each of the plurality of student-specific section groups.

EXAMPLE 11

The media of any of examples 8-10, wherein the instructions to remove the read/write permissions of the co-teacher from the personal folder of the teacher direct the processing system to request the server to remove the co-teacher from access to the personal folder of the teacher.

EXAMPLE 12

The media of any of examples 8-11, further comprising instructions that direct the processing system to add a new student to the class notebook by: assigning the new student a read-only role to the class notebook; creating a new section group in the class notebook; breaking a role inheritance setting of the new section group; assigning the new student with read/write permissions to the new section group; assigning the teacher and any co-teachers with read/write permissions to the new section group; and assigning the new student with read/write permissions to the collaboration space.

EXAMPLE 13

The media of any of examples 8-12, further comprising instructions that direct the processing system to remove the co-teacher from the class notebook by: removing access of the co-teacher to the class notebook; removing access of the co-teacher to the collaboration space; and removing access of the co-teacher to the plurality of student-specific section groups.

EXAMPLE 14

A system comprising: a processing system; a storage system; a classroom notebook application stored in the storage system that when executed by the processing direct the processing system to: in response to receiving a request to create a class notebook for a teacher, store a new class notebook in a personal folder of the teacher at a server and create section groups including a collaboration space section group and a content library section group; break a role inheritance of the collaboration space section group; assign read/write permissions for the teacher to the collaboration space section group after the role inheritance is broken; in response to receiving a request to add at least one student, assign each of the at least one student read-only access to the class notebook, create student-specific section groups in the class notebook for each of the at least one student, break role inheritances of the student-specific section groups, assign read/write permissions for each of the at least one student to a corresponding one of the student-specific section groups after the role inheritance is broken, assign read/write permissions for the teacher to the student specific section groups having the broken role inheritances, assign read/write permissions for each of the at least one student to the collaboration space section group having the broken role inheritance; in response to receiving a request to add a co-teacher to the class notebook, assign read/write permissions for the co-teacher to the class notebook, assign the co-teacher to the collaboration section group and each of the student-specific section groups having the broken role inheritances; and remove read/write permissions of the co-teacher from the personal folder of the teacher.

EXAMPLE 15

The system of example 14, wherein the classroom notebook application directs the processing system to assign the co-teacher to the class notebook by requesting the server to store the read/write permissions for the co-teacher associated with the class notebook.

EXAMPLE 16

The system of example 14 or 15, wherein the classroom notebook application directs the processing system to assign the co-teacher to the collaboration section group and each of the plurality of student-specific section groups by requesting the server to store the read/write permissions for the co-teacher associated with the collaboration section group and each of the plurality of student-specific section groups.

EXAMPLE 17

The system of any of examples 14-16, wherein the classroom notebook application directs the processing system to remove the read/write permissions of the co-teacher from the personal folder of the teacher by requesting the server to remove the co-teacher from access to the personal folder of the teacher.

EXAMPLE 18

The system of any of examples 14-17, wherein the classroom notebook application further directs the processing system to add a new student to the class notebook by: assigning the new student a read-only role to the class notebook; creating a new section group in the class notebook; breaking a role inheritance setting of the new section group; assigning the new student with read/write permissions to the new section group; assigning the teacher and any co-teachers with read/write permissions to the new section group; and assigning the new student with read/write permissions to the collaboration space.

EXAMPLE 19

The system of any of examples 14-18, wherein the classroom notebook application directs the processing system to remove the co-teacher from the class notebook by: removing access of the co-teacher to the class notebook; removing access of the co-teacher to the collaboration space; and removing access of the co-teacher to the plurality of student-specific section groups.

EXAMPLE 20

The system of any of examples 14-18, wherein the classroom notebook application directs the processing system to notify the co-teacher that they have access to the class notebook by populating the co-teacher's personal folder at the server with a link to the class notebook.

EXAMPLE 21

A system comprising at least one means for performing any of the examples 1-7.

EXAMPLE 22

A system comprising: a means for receiving a request, at a client device, to add a co-teacher to a class notebook associated with a personal folder of a teacher that is stored at a server, wherein the class notebook comprises a collaboration section group, a content library section group, and a plurality of student-specific section groups, wherein the collaboration section group and each of the plurality of student-specific section groups have broken role inheritances from the class notebook; a means for assigning the co-teacher to the class notebook, including any section groups of the class notebook having connected role inheritances, with read/write permissions; a means for assigning the co-teacher to the collaboration section group and each of the plurality of student-specific section groups, which have the broken role inheritances, with read/write permissions; and a means for removing read/write permissions of the co-teacher from the personal folder of the teacher.

EXAMPLE 23

An electronic notebook for a class comprising: a common space for collaboration between students and a teacher, a personal, private space for each student to which only the teacher and that student has access, and a means for adding and removing co-teachers to have the same permissions as the teacher for a specific class.

EXAMPLE 24

The electronic notebook of example 23, implemented according to any of examples 1-22.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of managing access permissions to class notebooks, comprising:
    receiving a request, at a client device, to add a co-teacher to a class notebook associated with a personal folder of a teacher that is stored at a server, wherein the class notebook comprises a collaboration section group, a content library section group, and a plurality of student-specific section groups, wherein each section group corresponds to one or more pages of the class notebook respectively and the collaboration section group and each of the plurality of student-specific section groups have broken role inheritances from the class notebook;
    assigning, via the client device, the co-teacher to the class notebook, including any section groups of the class notebook having connected role inheritances, with read/write permissions;
    assigning, via the client device, the co-teacher to the collaboration section group and each of the plurality of student-specific section groups, which have the broken role inheritances, with read/write permissions; and
    removing, via the client device, read/write permissions of the co-teacher from the personal folder of the teacher.

2. The method of claim 1, wherein assigning the co-teacher to the class notebook comprises requesting the server to store the read/write permissions for the co-teacher associated with the class notebook.

3. The method of claim 1, wherein assigning the co-teacher to the collaboration section group and each of the plurality of student-specific section groups comprises requesting the server to store the read/write permissions for the co-teacher associated with the collaboration section group and each of the plurality of student-specific section groups.

4. The method of claim 1, wherein removing the read/write permissions of the co-teacher from the personal folder of the teacher comprises requesting the server to remove the co-teacher from access to the personal folder of the teacher.

5. The method of claim 1, further comprising:
    notifying the co-teacher that they have access to the class notebook by automatically populating the co-teacher's personal folder with a link to the class notebook.

6. The method of claim 1, further comprising adding a new student to the class notebook by:
    assigning the new student a read-only role to the class notebook;
    creating a new section group in the class notebook;
    breaking a role inheritance setting of the new section group;
    assigning the new student with read/write permissions to the new section group;
    assigning the teacher and any co-teachers with read/write permissions to the new section group; and
    assigning the new student with read/write permissions to the collaboration space.

7. The method of claim 1, further comprising removing the co-teacher from the class notebook by:
    removing access of the co-teacher to the class notebook;
    removing access of the co-teacher to the collaboration space; and
    removing access of the co-teacher to the plurality of student-specific section groups.

8. One or more non-transitory computer readable storage media having instructions stored thereon that, when executed by a processing system, direct the processing system to:
  assign a co-teacher with read/write permissions to a class notebook associated with a personal folder of a teacher that is stored at a server, including any section groups of the class notebook having connected role inheritances, wherein the class notebook comprises a collaboration section group, a content library section group, and a plurality of student-specific section groups, wherein each section croup corresponds to one or more pages of the class notebook respectively and the collaboration section group and each of the plurality of student-specific section groups have broken role inheritances from the class notebook;
  assign the co-teacher to the collaboration section group and each of the plurality of student-specific section groups, which have the broken role inheritances, with read/write permissions; and
  remove read/write permissions of the co-teacher from the personal folder of the teacher.

9. The media of claim 8, wherein the instructions to assign the co-teacher to the class notebook direct the processing system to request the server to store the read/write permissions for the co-teacher associated with the class notebook.

10. The media of claim 8, wherein the instructions to assign the co-teacher to the collaboration section group and each of the plurality of student-specific section groups direct the processing system to request the server to store the read/write permissions for the co-teacher associated with the collaboration section group and each of the plurality of student-specific section groups.

11. The media of claim 8, wherein the instructions to remove the read/write permissions of the co-teacher from the personal folder of the teacher direct the processing system to request the server to remove the co-teacher from access to the personal folder of the teacher.

12. The media of claim 8, further comprising instructions that direct the processing system to add a new student to the class notebook by:
  assigning the new student a read-only role to the class notebook;
  creating a new section group in the class notebook;
  breaking a role inheritance setting of the new section group;
  assigning the new student with read/write permissions to the new section group;
  assigning the teacher and any co-teachers with read/write permissions to the new section group; and
  assigning the new student with read/write permissions to the collaboration space.

13. The media of claim 8, further comprising instructions that direct the processing system to remove the co-teacher from the class notebook by:
  removing access of the co-teacher to the class notebook;
  removing access of the co-teacher to the collaboration space; and
  removing access of the co-teacher to the plurality of student-specific section groups.

14. A system comprising:
  a processing system comprising one or more processors;
  a storage system comprising memory; and
  a classroom notebook application stored in the storage system that, when executed by the processing system, directs the processing system to:
    in response to receiving a request to create a class notebook for a teacher, store a new class notebook in a personal folder of the teacher at a server and create section groups including a collaboration space section group and a content library section group, wherein each section group corresponds to one or more pages of the class notebook respectively;
    break a role inheritance of the collaboration space section group;
    assign read/write permissions for the teacher to the collaboration space section group after the role inheritance is broken;
    in response to receiving a request to add at least one student, assign each of the at least one student read-only access to the class notebook, create student-specific section groups in the class notebook for each of the at least one student, break role inheritances of the student-specific section groups, assign read/write permissions for each of the at least one student to a corresponding one of the student-specific section groups after the role inheritance is broken, assign read/write permissions for the teacher to the student specific section groups having the broken role inheritances, assign read/write permissions for each of the at least one student to the collaboration space section group having the broken role inheritance; and
    in response to receiving a request to add a co-teacher to the class notebook, assign read/write permissions for the co-teacher to the class notebook, assign the co-teacher to the collaboration section group and each of the student-specific section groups having the broken role inheritances; and remove read/write permissions of the co-teacher from the personal folder of the teacher.

15. The system of claim 14, wherein the classroom notebook application directs the processing system to assign the co-teacher to the class notebook by requesting the server to store the read/write permissions for the co-teacher associated with the class notebook.

16. The system of claim 14, wherein the classroom notebook application directs the processing system to assign the co-teacher to the collaboration section group and each of the plurality of student-specific section groups by requesting the server to store the read/write permissions for the co-teacher associated with the collaboration section group and each of the plurality of student-specific section groups.

17. The system of claim 14, wherein the classroom notebook application directs the processing system to remove the read/write permissions of the co-teacher from the personal folder of the teacher by requesting the server to remove the co-teacher from access to the personal folder of the teacher.

18. The system of claim 14, wherein the classroom notebook application further directs the processing system to add a new student to the class notebook by:
  assigning the new student a read-only role to the class notebook;
  creating a new section group in the class notebook;
  breaking a role inheritance setting of the new section group;
  assigning the new student with read/write permissions to the new section group;
  assigning the teacher and any co-teachers with read/write permissions to the new section group; and
  assigning the new student with read/write permissions to the collaboration space.

19. The system of claim 14, wherein the classroom notebook application directs the processing system to remove the co-teacher from the class notebook by:
- removing access of the co-teacher to the class notebook;
- removing access of the co-teacher to the collaboration space; and
- removing access of the co-teacher to the plurality of student-specific section groups.

20. The system of claim 14, wherein the classroom notebook application directs the processing system to notify the co-teacher that they have access to the class notebook by populating the co-teacher's personal folder at the server with a link to the class notebook.

* * * * *